United States Patent [19]
Alexander

[11] 4,122,902
[45] Oct. 31, 1978

[54] MOTORIZED GARDENING TOOL

[76] Inventor: Warren A. Alexander, P.O. Box 147, Industry, Tex. 78944

[21] Appl. No.: 840,552

[22] Filed: Oct. 11, 1977

[51] Int. Cl.² .............................................. A01B 1/06
[52] U.S. Cl. ..................................................... 172/41
[58] Field of Search ........................ 172/41, 96, 42, 43, 172/103, 104, 117

[56] References Cited

U.S. PATENT DOCUMENTS

| 1,801,017 | 4/1931 | Major | 172/41 |
| 1,827,074 | 10/1931 | Ditlevsen | 172/41 |
| 3,057,412 | 10/1962 | Hovis, Jr. | 172/42 |

FOREIGN PATENT DOCUMENTS

| 1,042,934 | 11/1958 | Fed. Rep. of Germany | 172/42 |
| 2,037,748 | 2/1972 | Fed. Rep. of Germany | 172/41 |
| 835,480 | 9/1938 | France | 172/41 |
| 99,909 | 7/1923 | Switzerland | 172/96 |
| 17,705 | 8/1907 | United Kingdom | 172/42 |
| 842,871 | 7/1960 | United Kingdom | 172/41 |

*Primary Examiner*—Richard T. Stouffer
*Attorney, Agent, or Firm*—Gary C. Honeycutt

[57] ABSTRACT

A motorized, hand-held garden cultivating tool having a novel assembly of parts for converting a first reciprocating motion to a second reciprocating motion at a substantial angle to the first. The conversion assembly includes a spring-connected linkage member and is free of bearings or any friction contact that would require protection from soil or grit.

4 Claims, 4 Drawing Figures

MOTORIZED GARDENING TOOL

In the usual practice of gardening of either vegetables or flowers, the soil is prepared for the plants or seeds by a preliminary tillage. This operation is done by a variety of methods that include plowing, spading and tilling with a motor driven garden tiller. The choice of the tillage method used is determined by the size of the garden and the type of soil, as well as considerations of labor requirements.

After the garden has been tilled and the seeds or plants are in place, it is necessary from time to time to cultivate the soil of the garden during the growing season of the garden plants. Undesirable weeds or grass frequently come up in the garden and will rob the garden plants of plant food and moisture if they are not removed. Also, it is desirable to maintain the surface of the garden soil in a loose cultivated condition to form a mulch and conserve the moisture in the soil. The customary method for doing these two operations, weeding and mulching, is usually reduced to the one operation of hoeing the garden. In large commercial operations of growing garden plants, the labor intensive practice of hoeing is avoided as much as possible by using herbicides that keep the undesirable weeds and grass to a minimum. In these large operations, the mulching of the soil is performed by powered machinery and is not done as completely as it is in the home garden.

It is for the purpose of reducing the labor required for the garden hoeing that the tool of this invention is to be used. In the illustrated embodiments, the tool has a motor mounted on the handle which causes the cultivating blade to move in a reciprocating or oscillating manner to produce the cultivation of the soil. The gardener holds the tool in a position to which he is accustomed in holding a garden hoe. and guides the cultivating blade to the correct locations for destroying the undesirable weeds and grass and for cultivating the surface of the soil.

The accompanying drawings illustrate the structure and use of the invention.

Figure 1:
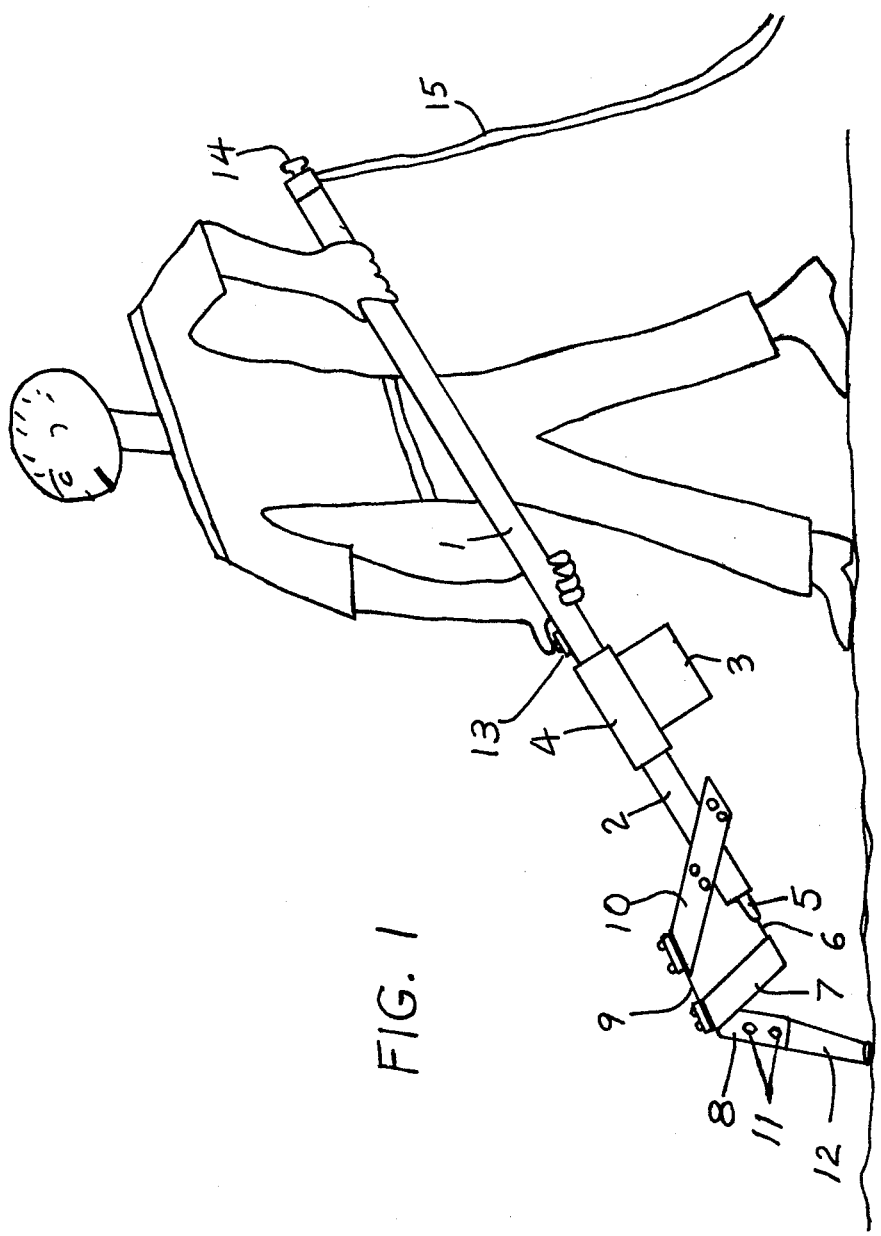
FIG. 1 illustrates how the invention is held and guided by the gardener.

In FIG. 1 the gardener is holding the tool of the invention in the usual manner that a garden hoe is held. The handle 1 and 2 is of hollow tubular construction of metal or plastic. The electrical power cord 15, extends down through the tubular handle to the motor 3. A voltage control unit 14 is used to adjust the speed of the motor to be best suited to the immediate type of cultivation being done. The gardener operates with his thumb on the push-button switch 13, with which he starts and stops the motor and the cultivating blade. The ability to quickly start and stop the unit is very helpful in cultivating out the undesirable weeds and grass that are closely intermixed with the garden plants. In this situation, the blade is placed adjacent to the weed to be destroyed with the motor stopped, then the motor is started for just a few moments until the particular weed is destroyed and no damage is done to the desirable garden plants.

The motor 3 is directly coupled to the motion transforming gear box (which is more clearly visible in FIG. 3) that is supported by clamping member 4. The rotating motion of the motor is transformed into a reciprocating motion be the gear box, and the reciprocating output of the gear box is transmitted by the connecting rod 5 to the bell-crank link 7 and 8, and thence to the cultivating blade 12. The connecting rod 5 is located inside of and concentric with the lower segment of the tubular handle 2, and is supported at the lower end at its connection to the bell-crank arm 7 by the leaf spring member 6. The bracket member 10, which is rigidly attached to the handle 2, supports the fulcrum of the bell-crank 7 and 8. The fulcrum consists of the leaf spring 9, and it operates similar to the leaf spring 6 that couples the connecting rod 5 to the first bell-crank arm 7.

The application of the leaf springs 6 and 9 as pivot points has a definite advantage over the usual shaft and bearing type of pivot points in this application. The presence of dirt and grit in the gardens, where this invention is used, would present a serious problem to a shaft and bearing pivot in that the abrasive action of the dirt and grit would cause the shaft and bearing to wear away rapidly unless elaborate protective provisions were made. On the other hand, the leaf spring pivots require no lubrication and the dirt and grit cause the leaf springs no abrasion problem at all. Since the motion of the bell-crank 7 and 8 and the cultivating blade 12 is reciprocating, with the blade cycling through a range of distances ⅛ inch to 4 inches, the use of leaf springs 6 and 9 is very practical. The limited range of the reciprocation does not exceed the elastic limit of the spring material, so the life of the leaf spring pivots will not be a problem.

Figure 3:
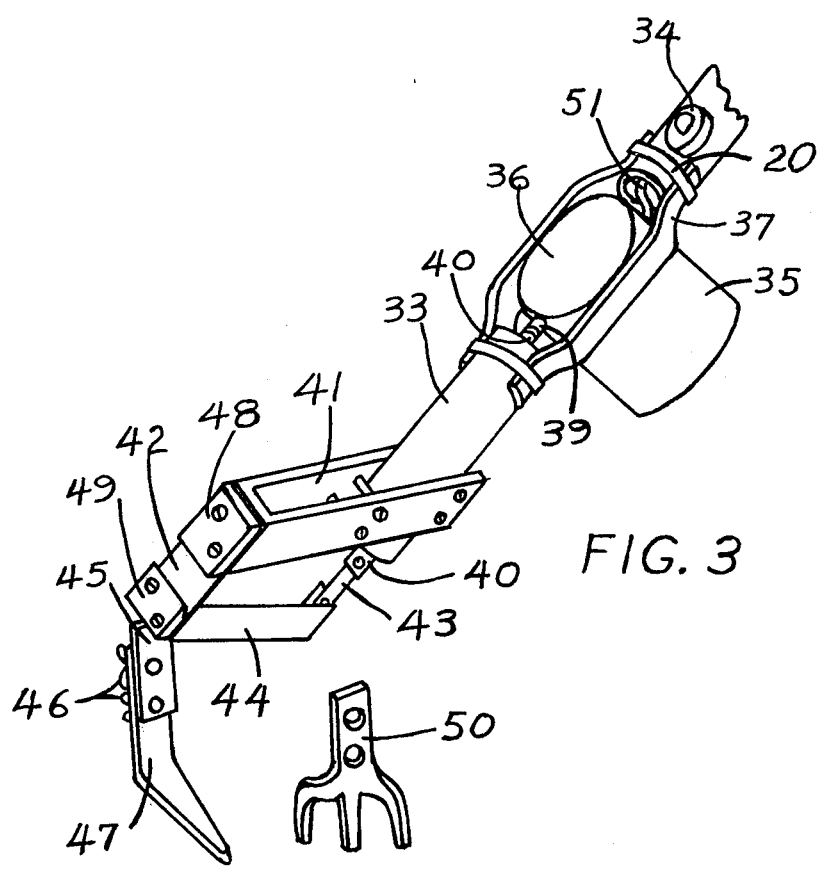
FIG. 3 is a perspective view of the invention, and shows more clearly certain features that were not evident in FIG. 2.

The cultivating blade 12 is attached to the second bell-crank arm 8 by two bolts 11, so that it can be readily removed for sharpening or replacement. In view of the great variety of applications in which this invention will prove advantageous, it will be important that different type blades can be readily attached. In FIG. 3 one alternate blade that has been found useful is shown as member 32. The more usual blade 12, is more similar to that of a garden hoe and has wide application for general weeding and cultivation. The blade 32 is useful in the case where the earth has a hard crust, as occurs when the soil dries after a rain, and the primary need is to break up the crust and develop a mulch around the garden plants.

In FIG. 1 the location of the motor 3 and the accompanying gear box is between the gardener's lower hand and the reciprocating blade. This location is of special advantage as it provides a necessary reaction mass for the reciprocating blade, yet it does not place such a great mass in the vicinity of the blade that rapid guiding of the blade in the vicinity of the garden plants is hampered. Furthermore, the location of the motor 3 between the reciprocating blade 12 and the gardener, protects the gardener from excessive vibration produced at the blade 12. The mass of the motor and gear box 3 absorb much of the vibrating forces produced by the reciprocation and impacts of the blade 12, so the gardener feels a relatively small amount of the vibration.

The motor 3 is attached to the handle 1 and 2 in such an orientation that its center of gravity is on the same side as the blade 12. With this orientation of the motor's center of gravity, it is much easier to hold the invention so the blade 12 makes contact with the earth at the proper angle.

The description of the invention has generally implied that the driving motor would be an electric motor, but is not intended to make this limitation. Other types of motors such as gasoline fueled or compressed air type would be very readily adapted to the invention. In that case the speed control 14 and the push button switch 13 would be replaced with suitable throttles, clutches or valves.

Figure 2:
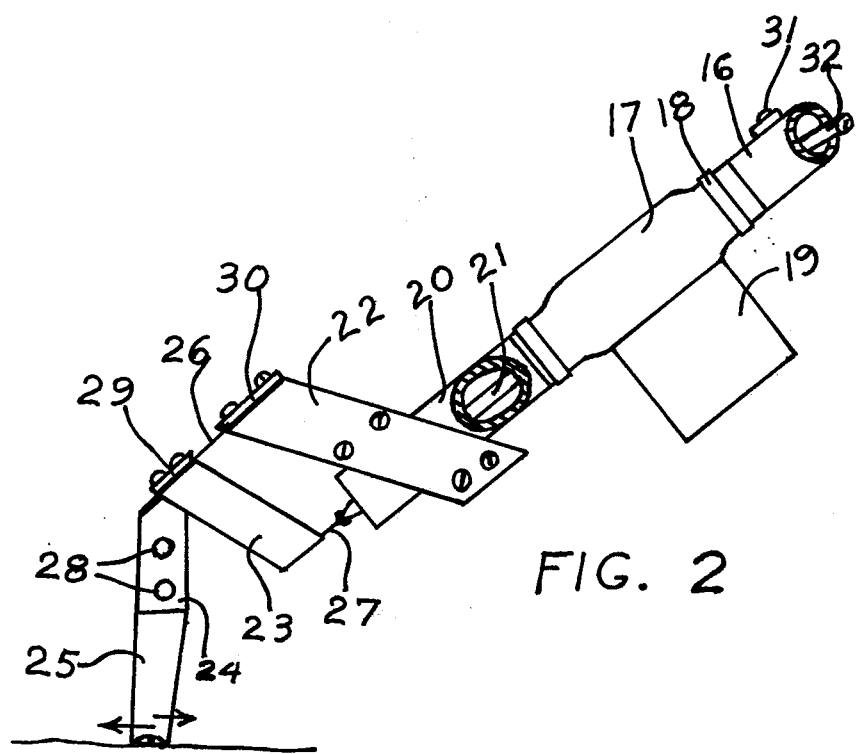
FIG. 2 is a side view of the invention and the details of this structure.

In FIG. 2 certain details of the invention are more clearly illustrated. The power cable 15 being located inside the tubular handle is clearly shown. the clamp 20 more clearly shows the manner in which the motor support member 4 is attached to the segments 1 and 2 of the tubular handle. the cut-away area in the segment 2 of the tubular handle shows the location of the connecting rod 5 concentric within the tubular handle and the connection of its lower end to the bell-crank arm 7 by the leaf spring 6.

FIG. 3, which is a perspective view of the invention, shows more clearly the location of the motion transforming gear box 30 which is built into the same housing as the motor 3. The gear box transforms the rotating motion of the motor into the reciprocating motion that is required in this application. The reciprocating output from the gear box 30, when desired, can be set to have a quick-return characteristic. That is, the outgoing stroke and the return stroke of the output rod 31 can be of different durations of time. In some applications it is desirable for the outgoing stroke of the reciprocating blade 12 to be slow, and for the return stroke of the blade to be quick. This type of quick-return action can be accomplished by a proper setting of the motion transforming gear box 30. The quick-return mechanism is well known in the mechanical sciences, and is explained in detail in *Mechanics of Machinery* by C. W. Ham and E. J. Crane, published by the McGraw-Hill Book Co., on pages 21, 22 and 23 also on pages 32, 33 and 34.

The continuation of the electric power cord 15 from the switch 13 to the motor 3 is clearly shown in this figure. The connecting rod 5 is shown where it is rigidly coupled to the output member 31 of the gear box 30, and also where it is flexibly connected to the bell-crank arm 7 by the leaf spring 6. The fulcrum of the bell-crank 7 and 8 is provided by the leaf spring 9. This leaf spring is attached to the support bracket 10 by the clamp 22, and to the bell-crank 7 and 8 by the clamp 21. These two clamps 21 and 22 have the lower corners rounded off next to the leaf springs in order to avoid a concentration of stress and a possibility of locally exceeding the elastic limit of the leaf spring.

Figure 4:
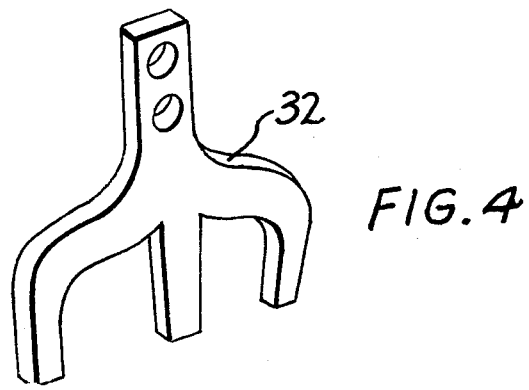
FIG. 4 is a perspective view of an alternate blade for use in the assembly of the invention.

The shape of the cultivating blade 12 is clearly shown, and the use of wing nuts 11 to facilitate the removal and replacement of the blade is also indicated. An alternate blade 32 is shown in FIG. 4, but this does not exclude the use of blades having other shapes which will certainly be found useful in specialized applications of this invention.

A specific embodiment of this invention that has proved to be very practical and trouble-free in home garden cultivation was assembled. The handle (1 and 2, FIG. 1) was aluminum tubing having 1-inch outside diameter and 0.055 inch wall thickness. The clamp 4 of FIG. 1 which supports the motor and gear box 3 was made from two lengths of aluminum 1¼ × ⅛ × 15 inches. The combined motor and gearbox 3 of FIG. 1 is a jig saw, Rockwell International Model 4300 type 2, 0.15 h.p., 3300 s.p.m. The speed control unit 14 (FIG. 1) is a light dimmer unit, General Electric catalog No. DIU 61D rated at 600 watts. Connecting rod 5 is aluminum tubing of ½ inch outside diameter, and support bracket 10 is aluminum strap ⅛ inch × 1¼ inch. Spring hinges 6 and 9 are leaf spring stock 0.020 inch thick. Spring 6 is ⅜ inch wide and 1½ inch long, with mounting holes spaced 1⅛ inch center to center. Spring 9 is 1¼ inch wide × 3 inches long, but the mounting clamps cover much of the spring so the flexing part is only ¾ inch long. Bell crank 7 and 8 is a strap of mild steel 0.08 inch thick, ½ inch wide. Cultivating tool 12 was made from the same material.

The stroke of the jig saw is ⅝ inch, and the lengths of the bell crank arms and the cultivating tool were selected so the stroke of the blade is about 1¼ inch. Although the rated maximum speed of the jig saw is 3300 strokes per minute, the speed control unit was set to a lower speed for most gardening situations. For loose soil and small weeds, a speed of about 600 strokes per minute seemed to be optimum. For harder soil and larger weeds a speed of about 2000 strokes per minute gives better results.

The tool was assembled with machine screws and rivets. Screws were used at places where it may be desired to remove parts for repair or replacement. It is important to use lock washers uner all nuts to prevent loosening from vibration.

Numerous variations of this structure, and other embodiments of the invention will be apparent to those skilled in mechanical design. All such variations and embodiments are covered by the appended claims.

What is claimed is:

1. A garden cultivating tool comprising:
   (a) a first shaft having a central bore,
   (b) a second shaft within said bore,
   (c) power means for imparting a first reciprocating motion to said second shaft,
   (d) an assembly of parts for converting said first motion to a second reciprocating motion, and
   (e) a blade in combination with said assembly,
   (f) said assembly including a first spring member connecting said second shaft to a linkage member which supports said blade, and
   (g) a second spring member supporting said linkage member at a point substantially separated from the point at which said first spring member is connected.

2. A tool as in claim 1 wherein said second spring member is anchored to a bracket member attached to said first shaft and extending therefrom at a substantial angle.

3. A tool as in claim 2 wherein said linkage member and said bracket member extend from the axis of said first shaft at substantially the same angle.

4. A tool as in claim 3 wherein the relaxed position of said second spring member is substantially parallel to said shafts and to said first spring member.

* * * * *